Patented Dec. 16, 1947

2,432,890

UNITED STATES PATENT OFFICE 2,432,890

FURFURYL ALCOHOL REACTION METHODS AND PRODUCTS

Herman I. Hersh, Toledo, Ohio, assignor to Owens-Illinois Glass Company, a corporation of Ohio No Drawing. Application March 9, 1944,
Serial No. 525,793

2 Claims. (Cl. 260—17.4)

This invention relates to organic resins of the heat-curing or thermosetting type and a method of producing the same, also the compounding of such resins with suitable fillers for the production of heat-curable compounds.

An object of the invention is to provide a novel heat-curing resin by reacting furfuryl alcohol with a saturated or unsaturated discarboxylic and/or other polycarboxylic organic acid or anhydride. Typical of such carboxyl containing compounds which may be used for this purpose are maleic acid, maleic anhydride, fumaric acid, and oxalic acid.

A further object of this invention is to provide a new and improved molding compound and a novel method of producing the same. For this purpose the resin produced by the above method is mixed with suitable fillers such as wood flour, lignin-enriched filler, or exploded wood fibers, and other required additive materials, such as coloring matter, plasticizers, and lubricants, and the mixture is then reacted under heat and pressure as hereinafter described.

In the past, furfuryl alcohol resins have been made by the use of inorganic acid catalysts, such as hydrochloric acid, or else metal halides were used, which formed strong acidic solutions in water, such as ferric chloride, stannic chloride, aluminum chloride, or their metallic bromides and the like. These resins are characterized by the lack of control in their formation and their instability on standing after the resin has been made. This results in a non-uniform resin due to the lack of adequate control in the cooking of the resin, and also very short shelf life of the resulting molding compound or resin due to its continuous acidic properties.

The present invention makes practical the formation of furfuryl alcohol resins through the use of catalysts that are relatively inactive or latent at room temperatures and slow acting at the medium temperatures at which the resin is formed. The lack of acidic characteristics of these catalysts at the low storage temperatures insures a longer shelf life of the resin on standing and continued stability of the final molding compounds on storage. These latent catalysts exhibit their acidic characteristics increasingly as the temperature is increased. Thus, at the high temperatures of molding, the acids react as strong catalysts to cause the complete cure of the resin, thereby forming a thermosetting molded article in a very short time under pressure.

In practicing the invention, a resin may be formed by the reaction between furfuryl alcohol and a dicarboxylic acid such as above specified. The furfuryl alcohol and acid are combined and are reacted at a temperature within the range of about 194° to 230° F., with the ingredients in the proportion, preferably, of 1 to 10 parts of the acid, to 99 to 90 parts of furfuryl alcohol. I have found that satisfactory results can be obtained by the use of acids such as those above mentioned in proportions ranging from about 1 to 10 per cent of the mixture. I have found, however, that percentages ranging from 3 to 7 per cent are usually most practical. The percentage depends on the type of resin desired and the kind of organic acid catalyst used. All the percentages mentioned above and the proportions of parts herein specified are by weight.

In the resin formation, the reaction may be arrested at a stage where the resulting cooled resin is like a syrup in nature, and may be subsequently mixed with the fillers for the formation of the molding compound in a standard dough mixer or the like prior to advancing and compounding on the hot rolls or Banbury. The reaction, instead of being arrested at the stage above noted, may be carried on to a more advanced stage whereby the cooled resin is hard and either may be ground to a powder and thus mixed with the fillers or else may be fluxed on cold rolls and the fillers worked into the resin prior to the advancement in the customary hot rolls or Banbury.

The resins formed by reacting furfuryl alcohol with an acid in the manner above pointed out may be mixed with a filler such as wood flour or lignin-enriched filler and any other desired materials such as coloring matter and lubricants, and the mixture treated under heat and pressure to advance the reaction to the desired degree for forming the molding compound. The molding compound sheet may then be ground to the desired particle size for use as a thermosetting molding powder and is capable of setting under heat and pressure in suitable molds, in keeping with the usual methods of compression molding.

A molding powder produced in accordance with my invention is adapted for molding numerous articles such as are commonly formed from an ordinary thermosetting compound of the phenol formaldehyde type. It is also advantageous, in the formation of the resin and molding compound, in accordance with the present invention, to reduce the amount of catalyst in the original resin formation so that the reaction is easily kept under control. If such action is taken, the additional catalyst may be added in the mixing operation just prior to advancement of the compound on the hot rolls or Banbury. Added portions of catalyst will cause the material to set faster in the molds under heat and pressure. However, care must be exercised in order not to overload the compound with acids in such manner that the advancement of the molding powder is beyond control, or the shelf life of the resulting molding powder is too short.

Examples of the method of forming resin and the preparation of the molding powder in accordance with my invention are as follows:

EXAMPLE No. 1

*Resin Formula No. 1*

| | Parts |
|---|---|
| Furfuryl alcohol | 97 |
| Maleic anhydride | 3 |

The materials are mixed in a suitable container and slowly heated, while being constantly stirred, to 212° F. The heat then generated by the exothermic reaction is sufficient to hold the ingredients at that reaction temperature so that the external application of heat may be discontinued. Care should be taken to hold the reaction below 220° F. The resin is sufficiently reacted in from 20 to 30 minutes and is then poured into a pan to cool.

EXAMPLE No. 2

*Resin Formula No. 2*

| | Parts |
|---|---|
| Furfuryl alcohol | 100 |
| Oxalic acid | 1.5 |

The materials are mixed and treated in the same manner as in the preceding example except that, due to the smaller amount of catalyst, so that the resin is easily controlled, the reaction is arrested in from 40 to 60 minutes and cooled. The resin resulting from this treatment will be a liquid of the consistency of a heavy syrup, after cooling.

EXAMPLE No. 3

*Preparation of molding powder*

| | Parts |
|---|---|
| Above resin No. 1 | 46 |
| Wood flour | 52 |
| Carbon black | 1.4 |
| Zinc stearate | .6 |

The ingredients are compounded as follows:
The resin is fluxed onto the differential rolls while the rolls are cold, and the dry filler and other ingredients are added and worked into the resin. When the ingredients have been sufficiently mixed, the mixture may be removed and the temperature of the rolls raised to 250° to 350° F. The material is then again placed onto the rolls and advanced from ½ to 20 minutes, depending upon the proportion of the catalyst in the resin. The resulting compound, when cooled, is hard and brittle and can be ground to the desired particle size for molding, in a suitable grinder.

EXAMPLE No. 4

*Preparation of molding powder*

| | Parts |
|---|---|
| Resin No. 2 | 46 |
| Wood flour | 50 |
| Carbon black | 1.4 |
| Zinc stearate | .6 |
| Oxalic acid | 2.0 |

The resin No. 2 used in this example is a liquid and may be mixed with the above dry ingredients in a suitable dough mixer for from 15 to 30 minutes. The resulting mass can then be placed on the hot rolls or Banbury, heated to 250° to 350° F., and advanced to the desired stage in from 20 seconds to 5 minutes. The sheet is thereafter ground and may be molded at 330° F. to 380° F. under two thousand pounds pressure per square inch, from 20 to 60 seconds.

In the above examples, any of the ordinary fillers may be substituted, in whole or in part, for wood flour. Such added fillers may include enriched lignocellulose, the exploded redwood fillers, or finely ground shell flours.

Modifications may be resorted to within the spirit and scope of my invention.

I claim:

1. The method which comprises producing a resin by mixing 90 to 97 parts of furfuryl alcohol with 10 to 3 parts of dicarboxylic acid, stirring the material and applying heat thereto in an amount to slowly raise the temperature to 212° F. thereby initiating a reaction, retaining the ingredients at the reaction temperature by the heat generated by the exothermic reaction, for from 20 to 30 minutes and then cooling the material, combining the resin thus produced with other materials as follows and in the following percentages, namely

| | Per cent |
|---|---|
| Said resin | 46.0 |
| Wood flour | 52.0 |
| Carbon black | 1.4 |
| Zinc stearate | 0.6 | mixing said ingredients together, advancing the mixture on rolls at a temperature of 330° F. for from one-half minute to 20 minutes, thereby producing a compound which, when cooled, is hard and brittle, and reducing the compound to comminuted form.

2. The product of the method defined in claim 1.

HERMAN I. HERSH.

REFERENCES CITED

The following references are of record in the file of this patent:

UNITED STATES PATENTS

| Number | Name | Date |
|---|---|---|
| 1,665,235 | Trickey | Apr. 10, 1928 |
| 2,058,597 | Koenig | Oct. 27, 1936 |
| 2,323,333 | Kauth | July 6, 1943 |
| 2,335,701 | Root | Nov. 30, 1943 |
| 2,343,973 | Harvey | Mar. 14, 1944 |
| 2,345,966 | Fiedler | Apr. 4, 1944 |